United States Patent
Bernhard et al.

(10) Patent No.: US 12,157,978 B2
(45) Date of Patent: Dec. 3, 2024

(54) METHOD AND DEVICE FOR STABILIZING A TRACK

(71) Applicant: PLASSER & THEURER EXPORT VON BAHNBAUMASCHINEN GESELLSCHAFT M.B.H., Vienna (AT)

(72) Inventors: Antony Bernhard, Stockerau (AT); Florian Auer, Vienna (AT); Fritz Kopf, Vienna (AT); Krzysztof Wilczek, Vienna (AT)

(73) Assignee: Plasser & Theurer Export von Bahnbaumaschinen GmbH, Vienna (AT)

( * ) Notice: Subject to any disclaimer, the term of this patent is extended or adjusted under 35 U.S.C. 154(b) by 883 days.

(21) Appl. No.: 17/288,639

(22) PCT Filed: Sep. 26, 2019

(86) PCT No.: PCT/EP2019/075961
§ 371 (c)(1),
(2) Date: Apr. 26, 2021

(87) PCT Pub. No.: WO2020/083599
PCT Pub. Date: Apr. 30, 2020

(65) Prior Publication Data
US 2021/0395954 A1    Dec. 23, 2021

(30) Foreign Application Priority Data
Oct. 24, 2018   (AT) .................................. A 331/2018

(51) Int. Cl.
*E01B 27/20*   (2006.01)
*E01B 35/00*   (2006.01)
*G01M 7/02*    (2006.01)

(52) U.S. Cl.
CPC .............. *E01B 27/20* (2013.01); *E01B 35/00* (2013.01); *G01M 7/022* (2013.01); *G01M 7/025* (2013.01);
(Continued)

(58) Field of Classification Search
CPC .... E01B 27/20; E01B 35/00; E01B 2203/127; E01B 2203/16; G01M 7/022; G01M 7/025
See application file for complete search history.

(56) References Cited

U.S. PATENT DOCUMENTS 5,113,767 A   5/1992   Theurer
5,127,333 A   7/1992   Theurer
(Continued)

FOREIGN PATENT DOCUMENTS

AT   515801 A4   12/2015
AT   518373 A1   9/2017
(Continued)

*Primary Examiner* — Robert J McCarry, Jr.
(74) *Attorney, Agent, or Firm* — Laurence A. Greenberg; Ralph E. Locher; Werner H. Stemer

(57) ABSTRACT

A method for stabilizing a track having sleepers supported on a track ballast and rails secured to the sleepers, includes using a stabilizing unit which is connected to a machine frame that can be moved on the rails and has a vibration exciter and rollers that can roll on the rails. The vibration exciter generates in particular horizontal vibrations which run transversely to the track longitudinal direction. The course of a force exerted onto the track by the stabilizing unit is recorded over a vibration path during a vibration cycle by sensors. At least one parameter is derived from the course by an evaluation device and is used to evaluate the stabilizing procedure and/or the quality of the track ballast. A device for implementing the method is also provided.

18 Claims, 3 Drawing Sheets

(52) U.S. Cl.
CPC ..... *E01B 2203/127* (2013.01); *E01B 2203/16* (2013.01)

(56) References Cited

U.S. PATENT DOCUMENTS

| | | |
|---|---|---|
| 5,591,915 A | 1/1997 | Theurer et al. |
| 5,887,527 A | 3/1999 | Theurer et al. |
| 9,982,396 B2 | 5/2018 | Lichtberger et al. |
| 10,914,040 B2 | 2/2021 | Hofstaetter et al. |
| 10,914,041 B2 | 2/2021 | Auer et al. |

FOREIGN PATENT DOCUMENTS

| | | | |
|---|---|---|---|
| CN | 1054459 A | 9/1991 | |
| CN | 1114994 A | 1/1996 | |
| CN | 104818656 A | 8/2015 | |
| CN | 108603345 A | 9/2018 | |
| DE | 4102870 A1 | 8/1991 | |
| EP | 0666371 A1 | 8/1995 | |
| GB | 2250765 A | 6/1992 | |
| IN | 201837030845 A | 9/2018 | |
| WO | 2008009314 A1 | 1/2008 | |
| WO | WO-2017144152 A1 * | 8/2017 | ............. E01B 27/20 |

\* cited by examiner

METHOD AND DEVICE FOR STABILIZING A TRACK

BACKGROUND OF THE INVENTION

Field of the Invention

The invention relates to a method for stabilizing a track having sleepers supported on track ballast and rails fastened thereon, by means of a stabilizing unit which is connected to a machine frame mobile on the rails and comprises a vibration exciter as well as rollers designed to roll on the rails, wherein the vibration exciter generates in particular horizontal vibrations running transversely to the longitudinal direction of the track. The invention also relates to a device for implementation of the method.

Description of the Related

The stabilization of a track, also called dynamic track stabilization, serves for producing a lasting track position after lifting, lining and tamping a track in the ballast bed. During this, a horizontal vibration is produced by means of a stabilizing unit and transmitted to the track in order to bring about a better durability of the track position by jiggling the track into place. This greatly minimizes post-settlements in the ballast bed which occur after the lifting, lining and tamping of a track. Furthermore, the transverse displacement resistance of the track in the ballast bed is significantly increased. As a rule, stabilizing units are arranged on track maintenance machines which are called dynamic track stabilizers (DTS). A corresponding machine is known, for example, from EP 0 666 371 A1 or DE 41 02 870 A1.

In WO 2008/009314 A1, a stabilizing unit with a variable dynamic striking force is disclosed. In this, however, only the vibration effective on the respective rail head of the track can be measured, but not the resulting vibration of the sleepers of the track.

According to AT 518 373 A1, a method for stabilizing a track having a track ballast bed is known in which the generated vibrations of the track are recorded by means of a camera attached to the machine frame. In further sequence, a resulting vibration amplitude of the track grid is derived from the image data obtained.

SUMMARY OF THE INVENTION

The objects of the invention are to provide a method and a device of the type mentioned at the beginning with an improved stabilization behaviour, in particular with an optimized monitoring of the stabilization procedure.

According to the invention, these objects are achieved by a method for stabilizing a track having sleepers supported on track ballast and rails fastened thereon. The method includes using a stabilizing unit connected to a machine frame mobile on the rails having a vibration exciter as well as rollers configured to roll on the rails, the vibration exciter generating in particular horizontal vibrations running transversely to the longitudinal direction of the track, a course of a force acting from the stabilizing unit on the track over an oscillation path being recorded during a vibration cycle by sensors and, by using an evaluation unit, at least one parameter is derived therefrom by which an evaluation of the stabilizing procedure and/or a quality of the track ballast takes place. These objects are also achieved by a device for implementing the method having a stabilizing unit which is fastened to a machine frame and includes a vibration exciter as well as rollers configured to roll on rails, sensors disposed on the device for recording the course of a force acting from the stabilizing unit on the track over an oscillation path, measuring signals of the sensors being supplied to an evaluation device, and the evaluation device being configured for determining a parameter derived from the course. Advantageous further developments become apparent from the dependent claims.

In this, by means of sensors installed in particular on the stabilizing unit, a course of a force acting from the stabilizing unit on the track over an oscillation path is recorded during a vibration cycle, wherein, by means of an evaluation unit, at least one parameter is derived from this by means of which an evaluation of the stabilizing procedure and/or a quality of the track ballast takes place. The working process of stabilizing becomes a measuring procedure for determining on site the load-deformation behaviour of the track ballast and the changes thereof. By analysis of the measuring values in real time and formation of at least one parameter, it is possible to evaluate online the track ballast quality and the track ballast consolidation already during the stabilization procedure. In further sequence, process parameters of the consolidation and the stabilized track position can be adjusted continuously accordingly.

In this way, a method exists for consolidation control by means of work-integrated measurement at the track stabilizer and at the track being worked on. The dynamically excited stabilizing unit transmits vibrations to the track grid and its ballast bed, resulting in consolidation. During this, the stabilizing unit and the ballasted track form a dynamic interaction system, the state of movement of which allows conclusions as to the characteristics of the ballast bed condition. By suitable analysis, the system is used for consolidation control and for optimizing the ballast consolidation.

The advantage of process-accompanying consolidation control is a continuous quality control of the performed consolidation work and the documentation thereof. It also serves for optimizing the entire consolidation in connection with a tamping procedure which is carried out by means of a tamping unit prior to stabilizing. In this, a lifting of the track during track tamping takes place with a prescribed over-correction to the extent that, after the optimized final consolidation of the track ballast by means of the stabilizing unit, that track settlement occurs which leads precisely to the intended target position of the track. This advantage must be emphasized in particular in the case of combination machines which comprise a tamping unit as well as a trailing stabilizing unit.

While the aim should be a ballast condition as homogenized as possible after the consolidation, the achieving of an optimal final consolidation takes absolute precedence, so that the majority of the settlements of the track grid are anticipated in a controlled manner and the track position is henceforth stable. In this, a sufficient and, above all, uniform carrying capacity of the track ballast is an essential basic requirement for stability of the track position during railway operation.

Thus, the core of the invention lies in analysing the dynamic interaction system of track stabilizer—railway track, and to identify the dynamic characteristics of the individual components. In this, the primary focus lies in tracking the changes in those system parameters which describe the track ballast.

If, during the track ballast consolidation by means of the stabilizing unit, all of the process parameters (travel speed, frequency, eccentricity, vertical load, etc.) and the dynamic characteristics of the track grid (rail profile, rail fastenings, sleeper mass- and geometry, etc.) remain unchanged, then a change of the vibration behaviour can clearly be traced back to the change of the track ballast. By way of the measurements according to the invention and the analysis thereof, it is also possible to take into account or recognize the effects of changes of process parameters or track grid characteristics.

In a further development of the method, the parameter is specified as a parameter for the control of the stabilizing unit. The automatized adjustment of the stabilization procedure thus achieved allows a quick reaction to a changing condition of the ballast bed. For example, from the evaluation of the ballast bed quality, a specification value for a stabilization with changed vertical load or with adapted vibration frequency can be derived. Thus there is an automatic selection of the frequency of the dynamic excitation and of the static vertical load which the stabilizing unit exerts on the treated track in vertical direction. In this, it is favourable if an automatic control of the process parameters takes place.

In this manner, the measuring values of the work-integrated dynamic consolidation control are the basis for an automatic control of the process parameters for automatic optimal adjustment of the consolidation tool to the given ballast conditions in view of the optimal final consolidation of the track ballast by means of the stabilizing unit.

In an advantageous embodiment of the invention, when the vibration exciter is active, at least two eccentric masses rotate with phase positions matched to one another and with a prescribed angular frequency. With this, an adaptation of the introduction of vibrations into the track is possible in a simple manner, in that a changed phase position or changed angular frequency is prescribed. By adjusting the eccentric masses, the resulting eccentricity can be adapted steplessly.

Favourably in this, an excitation force is determined from the rotating mass, the eccentricity and the angular frequency. Since the mass and the eccentricity are known, the continuous recording of the angular frequency is sufficient to derive therefrom the excitation force. In the case of eccentric masses with adjustable eccentricity, this value is also included in the determination of the excitation force.

As a first advantageous parameter, the slope of the course is derived rail for determining the stiffness conditions. This inclination of the work line of the work diagram, indicating stress stiffness, provides information regarding the carrying capacity of the track ballast. It rises in the course of ballast stabilization and is used as proof of consolidation or stabilization. In this, it is favourable if a total inclination is determined by linear regression of the recorded course, for example by the method of least square error.

A curvature of the course is advantageously derived as a second parameter in order to determine damping conditions. For example, a damping coefficient of the resonating mass of the track can be determined. Via soil-mechanical principles, a spring constant, the damping coefficient and the resonating mass of the track stand in relation to the shear modulus of the track ballast which can be determined by retroactive calculation. The shear modulus of the track ballast is an important parameter for assessing the ballast stiffness and thus the consolidation condition of the track ballast.

A further advantageous parameter determination provides that, for at least one course of a force acting from the stabilizing unit on the track over the associated oscillation path, a circumscribed area is determined as dynamically transmitted work by means of circle integration over an excitation period in each case. For the work transmitted by the stabilizing unit to the rails and for the work transmitted by the rails to the track ballast bed, a respective performance per time interval ensues. These performance values correspond among each other as well as to a motor performance of the stabilizing unit.

Additionally, it is advantageous if a modal mass of the stabilizing unit is specified in the evaluation device, wherein a force acting on the rails is determined by taking into account the product of said modal mass times an acceleration of the stabilizing unit, and wherein the course of the force acting on the rails over the oscillation path of the stabilizing unit is determined. Advantageously in this, the acceleration of the stabilizing unit is determined as the second derivation of the oscillation path.

A further improvement of the method provides that a modal mass of the vibrating sleepers, in particular with a vibrating section of the rails, is specified in the evaluation device, that a force acting on the track ballast is determined by taking into account the product of said modal mass times an acceleration of the sleepers, and that the course of the force acting on the track ballast bed over the oscillation path of a sleeper is determined. In this, it is favourable if the vibration of the sleeper is recorded by means of a contactless sensor arranged on the machine frame.

Additional information about the track condition is gained if a mechanical model of the stabilizing unit and of the track section set in vibrations is stored in the evaluation device, and if soil-mechanical parameters are computed by means of said model. The measuring data recorded with the sensors enable in this way conclusions about dynamic characteristics of the system components set in vibration.

A further variant of the method provides that the recording of the course of the force over the oscillation path takes place while the stabilizing unit is in stationary operation. It is useful particularly for calibration- and testing purposes to halt the track maintenance machine containing the stabilizing unit during a measuring operation.

The device according to the invention for implementation of one of the described methods includes a stabilizing unit which is fastened to a machine frame and comprises a vibration exciter and rollers designed to roll on rails, wherein sensors for recording the course of a force acting from the stabilizing unit on the track over an oscillation path are arranged on the device, wherein measuring signals of the sensors are supplied to an evaluation device, and wherein the evaluation device is designed for determining a parameter derived from the course. In this manner, the stabilizing unit is used during an operative procedure additionally as a measuring apparatus to record a force-path progression (work diagram) of the unit and to derive from this a meaningful parameter.

Advantageously, at least one path measurement sensor is arranged on the device. With this, the position of the device on the track can be recorded in a simple manner and can be assigned to the parameter derived in each case. Then, a corresponding recording of the measuring results exists in a position-related manner, so that the condition of the track is documented over the entire treated section.

A further improvement of the device provides that the evaluation device is coupled to a device control in order to control the stabilizing unit in dependence on the parameter. Changed circumstances on the track thus automatically lead to an adjustment of the stabilization procedure in order to ensure a uniform consolidation quality throughout the treated track section.

For determining the forces generated by the stabilizing unit, the evaluation device advantageously includes a memory device in which modal masses of the stabilizing unit and the track to be stabilized are stored. The data of the sleepers and rails installed in the working area are usually known to the railway operator. If required, a measuring run is carried out in advance to record the necessary data. To that end, the device includes, for example, laser scanners for determining the rails and sleepers.

BRIEF DESCRIPTION OF THE SEVERAL VIEWS OF THE DRAWING

The invention will be described below by way of example with reference to the accompanying drawings. There is shown in a schematic manner in.

DETAILED DESCRIPTION OF THE INVENTION

Figure 1:
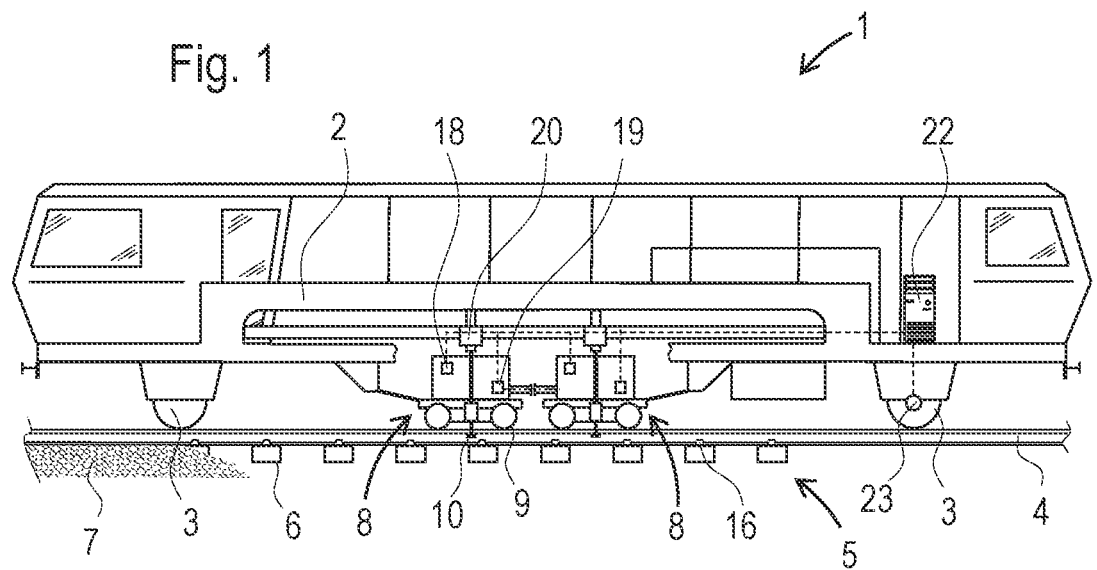
FIG. 1 a track maintenance machine having stabilizing units

The device 1 shown in FIG. 1 is configured as a track maintenance machine (dynamic track stabilizer DTS) and comprises a machine frame 2 which, supported on on-track undercarriages 3, is mobile on rails 4 of a track 5. The rails 4 are fastened to sleepers 6 and, together with these, form a track grid which is supported on track ballast 7. Advantageously, two stabilizing units 8 are movably connected to the machine frame 2 to transmit oppositely directed vibrations to the track 5. In simple embodiments, only one stabilizing unit 8 is provided.

The stabilizing unit 8 comprises flanged rollers 9 and clamping rollers 10 for gripping the track grid. Specifically, the gripping of the rails 4 by the clamping rollers 10 takes place by means of a clamping mechanism 11. Advantageously in this, the flanged rollers 9 are pressed against the rails 4 from inside by means of locked telescopic axles 12. The stabilizing unit 8 sets the track grid locally in vibrations which are transmitted by the track grid into the track ballast 7. The vibrations have the effect that the grains in the granular structure become mobile, allow displacement and assume a denser packing. In the case of new track ballast 7 without an appreciable portion of fine parts, the ballast 7 may start to flow which additionally enhances the consolidation effect. As a result of the consolidation of the track ballast 7, the bearing capacity and stiffness of the same are increased, and the settlement accompanying the consolidation are anticipated in a controlled way.

Figure 2:
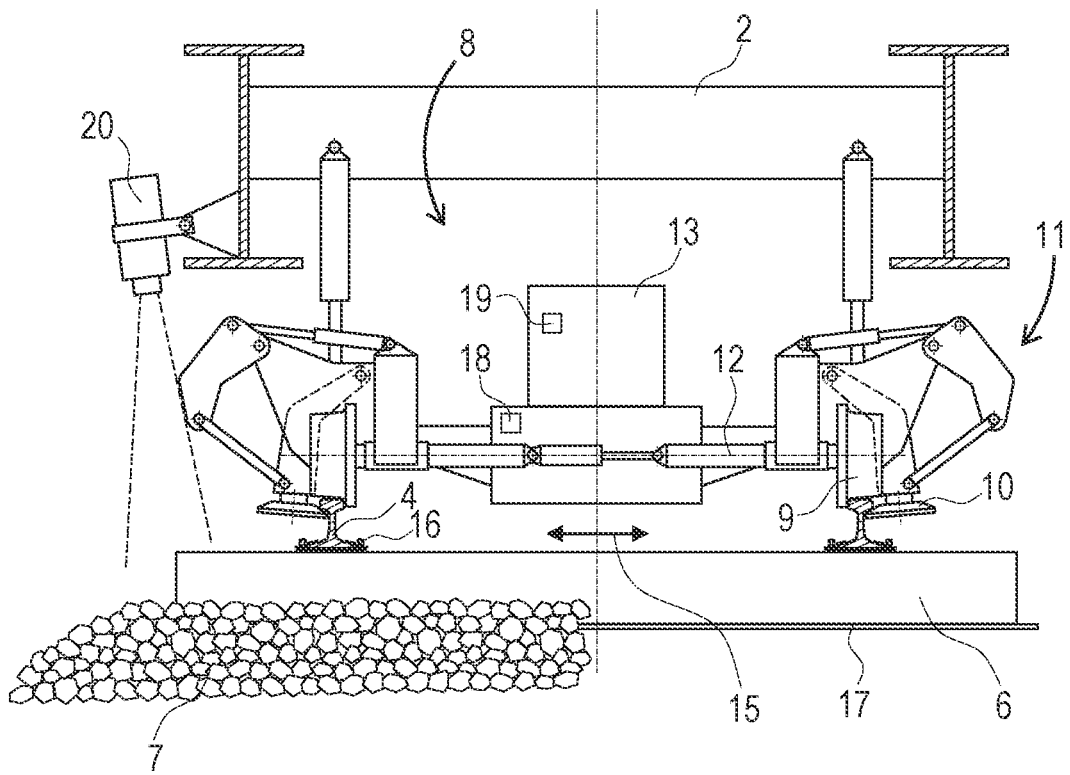
FIG. 2 a cross-section of a track with a stabilizing unit
Figure 3:
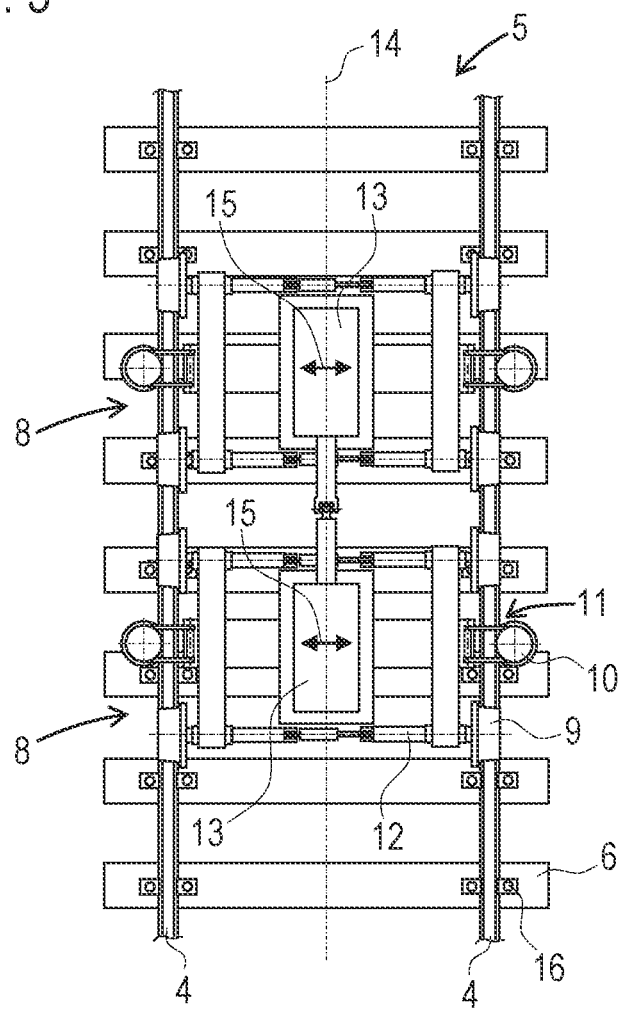
FIG. 3 a top view of a track with stabilizing units

FIG. 2 shows a cross-section through a railway embankment with the stabilizing unit 8 acting on the track 5. FIG. 3 shows a corresponding top view. The stabilizing unit 8 is dynamically excited in a horizontal direction transversely to the track axis 14 by means of a vibration exciter 13 (directed vibrator). Via the clamping rollers 10 and the flanged rollers 9, these horizontal vibrations 15 are transmitted to the rails 4 and, via the rail fastenings 16, to the sleepers 6. The respective sleeper 6—optionally by way of a sleeper sole pad 17—transmits the vibrations thus produced to the track ballast 7 which is to be consolidated.

In an exemplary embodiment, the vibration exciter 13 comprises rotating eccentric masses (imbalances) with phase positions synchronized with one another. Preferably, the eccentric masses rotate in opposite directions, wherein the eccentric forces cancel one another in vertical direction and amplify one another in horizontal direction. By changing the respective phase position or the eccentricity, the effect of the eccentric masses can be adjusted. In order to determine the size of the effective eccentricity, the frequency and the phase position of the dynamic excitation, the positions of the rotating eccentric masses are continuously recorded metrologically. In the case of alternative vibration exciters 13, the recording of the dynamic excitation takes place in a correspondingly suitable way.

According to the invention, a course 21 of a force F, $F_S$, $F_B$ acting by way of the stabilizing unit 8 on the track 5 over a vibration path $y_{DGS}$, $y_S$ (horizontal displacement) is recorded during a vibration cycle by means of sensors 18, 19, 20 arranged on the stabilizing unit 8. In the arrangement according to FIG. 2, a sensor 18 measures the motion of the stabilizing unit 8, and a sensor 19 measures the position of the rotating eccentric masses of the vibration exciter 13. For example, an acceleration $\ddot{y}_{DGS}$ is determined first by means of an acceleration sensor 18 and, by way of integration in each case, a vibration speed $\dot{y}_{DGS}$ and the vibration path $y_{DGS}$ of the stabilizing unit 8 and thus also of the rail heads is determined.

Advantageously, the state of motion of the sleepers 6 in the effective direction of the stabilizing unit 8 is determined by means of a contact-less sensor 20. This is, for example, a camera with automatized image evaluation which is aimed at the sleeper 8 set in vibration. In this manner, the displacement or the vibration path $y_S$ of the respective sleeper 8 is recorded.

Preferably arranged in the track maintenance machine for on-line evaluation is an evaluation device 22 to which sensor signals or data recorded by means of the sensors 18, 19, 20 are fed. This is, for example, an industrial computer with a memory device. In the memory device, structural data of the device 1 and the treated track 4 as well a dynamic model are stored. A software is installed in the evaluation device 22 by means of which work diagrams are compiled and evaluated. Additionally, measuring results of a path measuring sensor 23 are fed to the evaluation device 22 in order to link the work diagrams of the individual vibration cycles to a respective position on the track 5. In another embodiment, the evaluation device 22 is arranged in a central, wherein a data transmission is set up between the track maintenance machine and the central.

Figure 4:
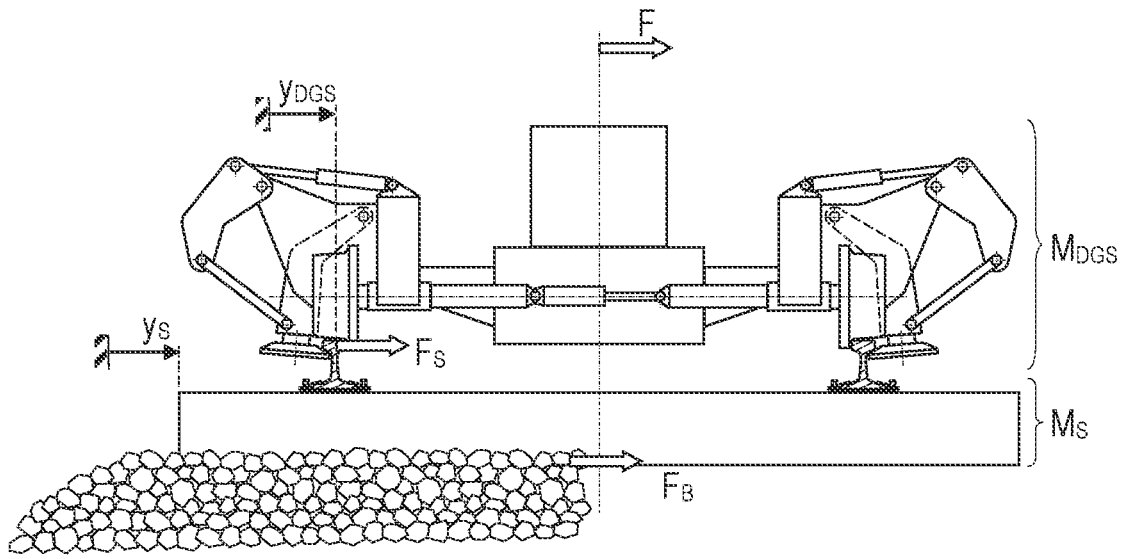
FIG. 4 a cross-section of a track with dynamic force introduction by means of the stabilizing unit FIG. 5 work diagrams FIG. 6 a dynamic model for describing the dynamic interaction of stabilizing unit and ballasted track

With reference to FIG. 4, path—displacement relationships (work diagrams) are explained which are compiled on the basis of the measurements according to the invention. The force F of the excitation of the stabilizing unit 8 by means of the vibration exciter 13 is the product of the effective eccentricity (eccentric mass m times eccentricity e) and the square of the excitation circuit frequency ω multiplied by the sinus of the product of excitation circuit frequency ω and time t:

$$F = m \cdot e \cdot \omega^2 \cdot \sin(\omega \cdot t)$$

Both amplitude and phase position are known from the measurements. The metrologically determined phase position serves as reference for the further phase positions and is thus set to zero in the calculation.

As a rule, the measurements take place in a work-integrated way during operation of the moved stabilizing unit 8, but they can also be carried out during a stand-still for calibration- or testing purposes in order to track the consolidating course at a fixed point.

The horizontal displacement $y_{DGS}$ of the stabilizing unit 8 and the derivations thereof with the related phase positions are known from the measurement. The mass $M_{DGS}$ of the stabilizing unit 8 and the modal mass $M_S$ of the excited sleepers 6 are known based on the design. The mass of the rail heads can be added modally to the mass $M_{DGS}$ of the stabilizing unit 8, and that of the rail bases to the modal mass $M_S$ of the excited sleepers 6.

If the respective mass inertia forces of the components are deducted from the excitation force F, then the excitation force $F_s$ on the sleeper 8 and the excitation force $F_B$ on the track ballast 7 can be determined $$F_B = F - \ddot{y}_{DGS} \cdot M_{DGS} - \ddot{y}_S \cdot M_S$$

$$F_S = F - \ddot{y}_{DGS} \cdot M_{DGS}$$

Figure 5:
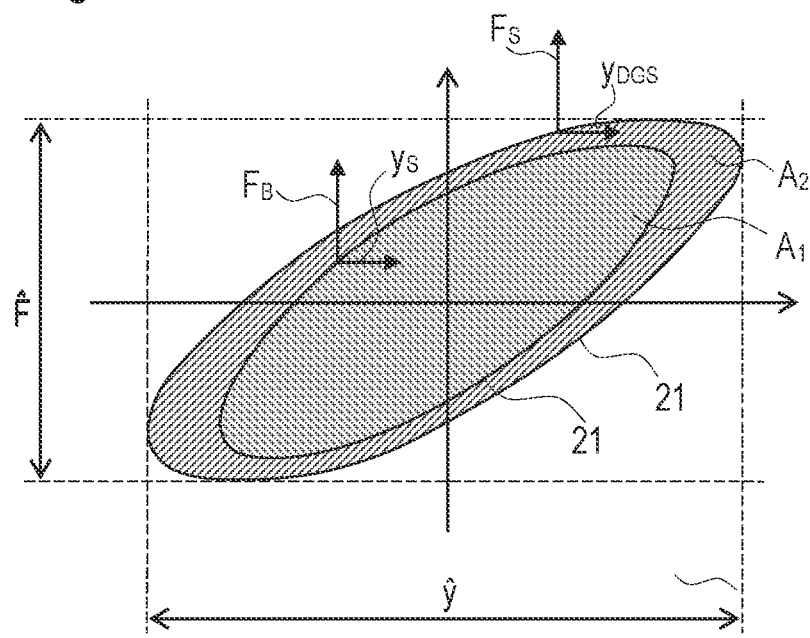

The work diagrams shown in FIG. 5 can be compiled from the relationships between these forces F, $F_B$, $F_S$ and the associated vibration paths or displacements $y_{DGS}$, $y_S$ in the effective direction. They give information about the stiffness relationships (inclination of the line) and damping relationships (curvature) as well as the work introduced into the system per excitation cycle (circumscribed area $A_1$ and $A_2$).

$$A_1 = \oint F_B \cdot dy_s$$

$$A_2 = \oint F_S \cdot dy_{DGS}$$

The amplitude relationships $\hat{F}$ of the forces F, $F_B$, $F_S$ and the amplitude relationships $\hat{y}$ of the vibration paths $y_{DGS}$, $y_s$ in the system can also be read out.

Figure 6:
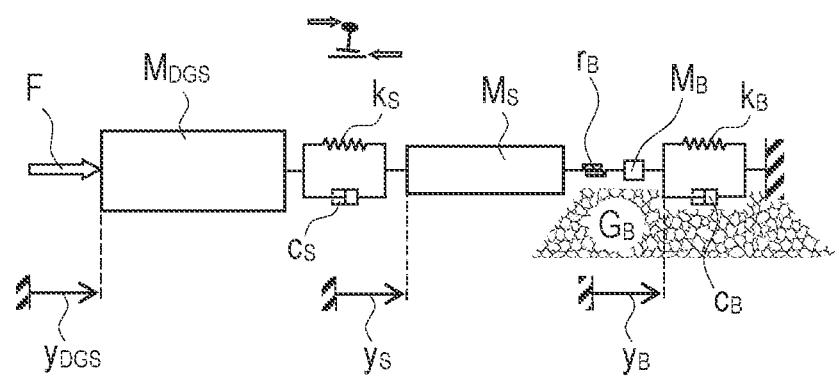

To determine the dynamic characteristics of the system components by way of the amplitudes and phase positions established from the measurements and the analysis thereof, a mechanical model according to FIG. 6 is used. In this, relevant system components for mechanical modelling are switched in series.

The metrologically known dynamic excitation force F acts on the modal mass $M_{DGS}$ of the stabilizing unit 8 which undergoes the displacement $y_{DGS}$. The stabilizing unit 8 is connected via the rails 4 and the rail fastenings 16 to the sleepers 6 (modal mass $M_S$ and displacement $y_S$). In this, the resilience of the rails 4 and rail fastenings 16 is modelled by means of a Kelvin-Voigt element (spring $k_S$ and damper $c_S$ arranged in parallel).

The sleepers 6 rest on the track ballast 7 which is modelled as a friction element $r_B$, optionally of a resonating mass $M_B$ and a Kelvin-Voigt element (spring $k_B$ and damper $c_B$ arranged in parallel). In this, the friction element $r_B$ describes the dynamic transverse displacement resistance.

Via soil-mechanical principles, the spring constant $k_B$, the damping coefficient $c_B$ and the resonating mass $M_B$ stand in relation to the shear modulus $G_B$ of the track ballast 7 which can be determined by retroactive calculation. Besides the information from the work diagrams (FIG. 5), the shear modulus $G_B$ of the track ballast 7 is one of the most important parameters for assessing the ballast stiffness and thus the state of consolidation of the track ballast 7. It is determined continuously by way of the process-related measurements (FIG. 2) by back-calculation with the aid of the mechanical model (FIG. 6).

If two or more stabilizing units 8 are working one behind the other in a track maintenance machine, then the described measuring principle can be applied to each of these stabilizing units 8. The results, determined independently of one another, are set in relation to one another, as a result of which additional information about track ballast condition, compactibility, development of carrying capacity, course of settlement, etc. is available and can be applied. Therefore, it is advantageous if several stabilizing units 8 are arranged one behind the other and if the measuring signals of the sensors 18, 19, 20 associated with the stabilizing units 8 are fed to a common evaluation device 22.

The invention claimed is:

1. A method for stabilizing a track having sleepers supported on track ballast and rails fastened on the sleepers, the method comprising:
   providing a machine frame being mobile on the rails;
   connecting a stabilizing unit to the machine frame, the stabilizing unit including a vibration exciter and rollers configured to roll on the rails;
   using the vibration exciter to generate vibrations running transversely to a longitudinal direction of the track;
   using sensors to record a course of a force acting from the stabilizing unit on the track over an oscillation path during a vibration cycle; and
   using an evaluation unit to derive at least one parameter from the course and to evaluate at least one of a stabilizing procedure or a quality of the track ballast.

2. The method according to claim 1, which further comprises using the vibration exciter to generate horizontal vibrations.

3. The method according to claim 1, which further comprises specifying the parameter as a parameter for controlling the stabilizing unit.

4. The method according to claim 1, which further comprises rotating at least two eccentric masses with phase positions matched to one another and with a prescribed angular frequency, during an activation of the vibration exciter.

5. The method according to claim 4, which further comprises determining an excitation force from the rotating masses, an eccentricity of the rotating masses and the angular frequency of the rotating masses.

6. The method according to claim 1, which further comprises deriving a slope of the course as a first parameter for determining stiffness conditions.

7. The method according to claim 6, which further comprises deriving a curvature of the course as a second parameter for determining damping conditions.

8. The method according to claim 1, which further comprises determining a circumscribed area as dynamically transmitted work by circle integration over each excitation period, for at least one course of a force acting from the stabilizing unit on the track over an associated oscillation path.

9. The method according to claim 1, which further comprises:
   using the evaluation device to specify a modal mass of the stabilizing unit;
   determining a force acting on the rails by taking into account a product of the modal mass times an acceleration of the stabilizing unit; and
   determining the course of the force acting on the rails over the oscillation path of the stabilizing unit.

10. The method according to claim 1, which further comprises:
   using the evaluation device to specify a modal mass of the vibrating sleepers;
   determining a force acting on the track ballast by taking into account a product of the modal mass times an acceleration of the sleepers; and
   determining the course of the force acting on the track ballast over the oscillation path of a sleeper.

11. The method according to claim 10, which further comprises using the evaluation device to specify the modal mass of the vibrating sleepers with a vibrating section of the rails.

12. The method according to claim 1, which further comprises storing in the evaluation device a mechanical model of the stabilizing unit and of the track section set in vibrations, and using the model to compute soil-mechanical parameters.

13. The method according to claim 1, which further comprises carrying out the recording of the course of the force over the oscillation path while the stabilizing unit is operated in a stationary manner.

14. A device for stabilizing a track having sleepers supported on track ballast and rails fastened on the sleepers, the device comprising:

a stabilizing unit fastened to a machine frame being mobile on the rails, said stabilizing unit including a vibration exciter and rollers configured to roll on the rails, said vibration exciter generating vibrations running transversely to a longitudinal direction of the track;

sensors disposed on the device for recording a course of a force acting from said stabilizing unit on the track over an oscillation path during a vibration cycle; and an evaluation device receiving measuring signals of said sensors, said evaluation device configured for determining a parameter derived from the course to evaluate at least one of a stabilizing procedure or a quality of the track ballast.

15. The device according to claim 12, wherein said vibration exciter generates horizontal vibrations.

16. The device according to claim 14, which further comprises at least one path measurement sensor.

17. The device according to claim 14, which further comprises a device control coupled to said evaluation device for controlling said stabilizing unit in dependence on the parameter.

18. The device according to claim 14, wherein said evaluation device includes a memory storing modal masses of said stabilizing unit and of the track to be stabilized.

* * * * *